United States Patent
Beck et al.

(10) Patent No.: US 6,945,613 B1
(45) Date of Patent: Sep. 20, 2005

(54) ELECTROHYDRAULIC BRAKE SYSTEM AND METHODS FOR ITS CONTROL

(75) Inventors: Harald Beck, Wuerzburg (DE); Juergen Binder, Ostfildern-Kemnat (DE); Juergen Hachtel, Moeckmuehl (DE); Ulrich Gottwick, Stuttgart (DE); Michael Schubert, Althengstett (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/576,582

(22) Filed: May 22, 2000

(30) Foreign Application Priority Data

May 22, 1999 (DE) .......................................... 199 23 689

(51) Int. Cl.[7] .............................................. B60T 8/32
(52) U.S. Cl. ............................. 303/191; 303/DIG. 11
(58) Field of Search ........................ 303/191, DIG. 11, 303/3, 10, 15, 122; 188/1.11 R, 1.11 E; 60/418

(56) References Cited

U.S. PATENT DOCUMENTS

| | | | | |
|---|---|---|---|---|
| 4,477,124 A | * | 10/1984 | Watanabe .................... | 303/191 |
| 4,671,576 A | * | 6/1987 | Fourie ........................... | 303/3 |
| 4,869,596 A | * | 9/1989 | Klein et al. ............. | 188/1.11 R |
| 5,584,543 A | * | 12/1996 | Sawada ....................... | 303/191 |
| 5,735,585 A | * | 4/1998 | Koike et al. ................. | 303/191 |
| 5,941,612 A | * | 8/1999 | Carpenter .................... | 303/122 |
| 6,007,165 A | * | 12/1999 | Sato et al. .................... | 303/191 |
| 6,030,314 A | * | 2/2000 | Brooks et al. ............... | 303/191 |
| 6,145,939 A | * | 11/2000 | Chang et al. ........... | 303/DIG. 2 |
| 6,203,123 B1 | * | 3/2001 | Oyama ........................ | 303/191 |

FOREIGN PATENT DOCUMENTS

| | | | | |
|---|---|---|---|---|
| DE | 196 51 154 | | 6/1997 | |
| DE | 196 04 126 | | 8/1997 | |
| JP | 2-120111 A | * | 5/1990 | .................. 303/10 |

* cited by examiner

*Primary Examiner*—Thomas Williams
(74) *Attorney, Agent, or Firm*—Kenyon & Kenyon

(57) ABSTRACT

An electrohydraulic brake system as well as a method and a device for controlling the electrohydraulic brake system, in which a hydraulic fluid can be injected from an accumulator into corresponding wheel brake cylinders by valve means, where the hydraulic fluid can be delivered to the accumulator by a pump, whereby means are provided for measuring the temperature of the electrohydraulic brake system, in particular the temperature of the hydraulic fluid, as well as means for taking into account the measured temperature for open- and closed-loop control of the electrohydraulic brake system.

19 Claims, 3 Drawing Sheets

ELECTROHYDRAULIC BRAKE SYSTEM AND METHODS FOR ITS CONTROL

FIELD OF THE INVENTION

The present invention relates to an electrohydraulic brake system.

BACKGROUND INFORMATION

A method for controlling a brake system is described in German Published Patent Application No. 196 51 154, in which is provided a pump that is operated by an electric motor and can be turned on and off, with the pump overtravel time after shutdown being determined and the control signals for braking force buildup and release, respectively, being corrected as a function of the overtravel time. The purpose of this method is to estimate the temperature of the brake system. Electrohydraulic brake systems in which hydraulic fluid is injected from an accumulator into the corresponding wheel brake cylinder via a valve arrangement are not the object of this publication.

A method for controlling the brake system of a vehicle, in which at least one control signal having at least one variable parameter is used to build up and/or release pressure, is described in German Published Patent Application No. 196 04 126. The at least one parameter is corrected as a function of at least one quantity influencing the pressure change dynamics. In particular, the temperature of the hydraulic system and the ambient temperature, respectively, are given as influencing quantities. This publication also does not discuss the control of electrohydraulic brake systems.

It is known that the function of electrohydraulic brake systems is limited at low temperatures, and that viscosity of the brake fluid greatly increases at these temperatures. Pressure compensation procedures can be introduced only slowly in this case, significantly reducing the effect of provided valves or a pump used to charge the accumulator of the electrohydraulic brake system. The function of an electrohydraulic brake system is also limited at high temperatures, since the electric elements used have only a limited service life at high temperatures.

It has been shown that the related art cited above does not produce optimum results in every respect as far as the special problems of an electrohydraulic brake system are concerned.

SUMMARY OF THE INVENTION

An object of the present invention is therefore to provide an electrohydraulic brake system whose functionality is improved at both high and low temperatures, as well as corresponding methods and a device for controlling the electrohydraulic brake system.

By measuring the temperature according to the present invention in an electrohydraulic brake system, a multiplicity of operating and monitoring procedures can be carried out that cannot be performed in conventional electrohydraulic brake systems. Fault-free or improved operation of the electrohydraulic brake system can be ensured, particularly at low and high temperatures.

The elements for measuring temperature suitably have at least one temperature sensor. It has proven to be especially advantageous to use multiple temperature sensors, making it possible to perform a two-of-three selection as part of a safety control procedure, for example, so that the system can continue to be operated and monitored for temperature even if one temperature sensor fails. It is possible, for example, to use temperature measuring elements provided in pressure sensors as the temperature sensors. However, separate temperature sensors can also be installed.

In a particularly preferred embodiment of the method according to the present invention, heat-generating processes are minimized as a function of the measured temperature, taking into account an adequate functionality of the electrohydraulic brake system. In the case of sustained-action braking, for example, the on/off and block valves of the electrohydraulic brake system is supplied with power for long periods of time. The heat this generates in the valves via the elements in the control unit causes all component temperatures to rise steadily. The temperature signal detected according to the present invention can be used to determine that the temperature has exceeded set limits, enabling the control unit to change or minimize, on the basis of this information, all heat-generating processes in the control unit with regard to their contribution to total heat, with it being possible to take into account functional restrictions as the temperature rises, always maintaining a certain basic brake function.

In addition to performing various actions, for example when limit values are exceeded, these actions can be at least partially made visible to the vehicle occupants, in particular the driver. For example, the deactivation of certain heat-generating processes or the reduced functionality of such processes can be displayed to the driver, e.g., by a display device on the instrument panel or some other type of viewing device.

When a preset temperature limit is exceeded in the control unit, for example, the following strategy, i.e., corresponding actions, can be selected to prevent overheating of the electrical and mechanical components needed for control (for example, in a mounted control unit, i.e., a control unit that is mounted directly on a hydraulic unit): on the front axle, it is possible to first switch to a backup mode (a preset fallback mode), preventing valves from being activated on the front axle and causing open balance valves to regulate the pressure on the rear axle. If the temperature continues to rise, the system can then go to full backup mode until a corresponding, lower temperature signal is received and the electrohydraulic brake system can be partially or completely reactivated. "Backup mode" refers to at least one operating mode of the electrohydraulic brake system that is reached by initiating certain procedures, such as shutting down certain functions. If there are multiple backup modes, the lowest backup mode at the time open- or closed-loop control of the electrohydraulic system begins is the mode that ensures a functionally minimum level of initiated control, i.e., a basic function. All open- and closed-loop control circuits for the electrohydraulic brake system that influence the braking action and/or vehicle stability and/or vehicle safety can be used as the open- and closed-loop control system. In this case, the full backup mode designates a situation in which the open- and closed-loop system is shut down and only a remaining hydraulic-mechanical intervention is used.

The mark-to-space ratio is suitably varied as a function of the measured temperature during clocked control of a pump in the electrohydraulic brake system. The pump of an electrohydraulic brake system is normally only driven at full power when the receiver pressure drops below a minimum braking value. Above this threshold, the pump usually operates in clocked mode to minimize the noise level. Exceptions to this open- and closed-loop control strategy typically occur only in situations in which an enormous decrease in receiver pressure can be concluded from the receiver pressure variation. At very low temperatures, however, the pump delivery rate may be reduced so that additional clocking would produce long receiver pressure buildup times, thus jeopardizing system availability. Such a slow rise in pressure would, for example, also cause the safety logic of the electrohydraulic brake system to respond, since, without any further information, the pressure increase is initially implausible and indicates an error in the system. The temperature information provided according to the present invention can be used to categorize this low-temperature performance of the charge pump as being plausible, thus preventing the electrohydraulic brake system from being erroneously shut down. This can maintain the availability of the electrohydraulic brake system even during short low-temperature phases (for example until the engine compartment warms up), i.e., the status of the electrohydraulic brake system can be recognized as being a temporary low-temperature status.

It has proven to be advantageous to take into account the measured temperature for controlling the system pressure in the electrohydraulic brake system, in particular during a buildup in pressure in at least one wheel brake, by opening corresponding intake valves. A pressure regulator of the electrohydraulic brake system, which regulates the pressure building up in the wheel brakes as a function of, for example, driver requests or control signals of the stop control system and/or traction control system, has a tendency to vibrate at low temperatures. This affects other control systems influencing the braking action and/or vehicle stability and/or vehicle safety. This effect is based on physical changes in the behavior of the brake fluid at low temperatures. For example, opening the intake valves to build up pressure in the wheel brakes causes pressure waves to form which produce a much different time response at low temperatures than at high ones, due to the modified elasticity of the brake fluid. When regulating pressure, this ordinarily means that a phase lag occurs between the actual pressure and the measured actual wheel pressure (in a hydraulic unit). By measuring and taking into account the system temperature, such phase lags can be included in the control procedure, e.g., when low temperatures occur in the controlled system, if detected at a low temperature.

It has proven to be advantageous to use the measured temperature to estimate the pressure in the accumulator. In properly working electrohydraulic brake systems, the pressure prevailing in the accumulator is input continuously so that the pump can be driven until the desired receiver pressure is reached. A receiver pressure sensor is normally used for this purpose. If this receiver pressure sensor is defective, or if the sensor feed lines are short-circuited in the direction of adjacent pins or connections, the control currents at the control valves can be used to determine the hydraulic pressure difference in one wheel intake valve, and thus the receiver pressure if the pressure at the wheel is known. Other methods that make it possible to estimate the receiver pressure are also known.

An intake control valve of the rear axle is advantageously driven with a ramp-like current-time setting until a first pressure rise can be detected at the wheel pressure sensor, immediately decreasing this pressure so that it does not have a noticeably disturbing effect. To prevent a disturbing superimposition of non-linearities onto the valve current opening pressure characteristic during a partial braking action, this wheel is removed from the control loop of a electrohydraulic brake system, i.e., depressurized. The power level at which a rise in pressure begins is a measure of the hydraulic pressure difference at the valve. This usually enables the receiver pressure to be estimated with a sufficient degree of accuracy to maintain emergency operation in the erroneous absence of receiver pressure information, i.e., the failure of a receiver pressure sensor. Because an item of temperature information about the electrohydraulic brake system is available according to the present invention, the control current can be converted to magnetic forces, and thus also more accurately convert the pressure difference at the intake control valve, making it possible to estimate the receiver pressure more accurately and reliably. In addition, the current ramp can be slowed down in the presence of low temperatures to take into account the changed time response of the cold brake fluid. Taking into account the temperature of the electrohydraulic brake system generally improves reliability during emergency operation.

Generally speaking, the measured temperature is also advantageously used in controlling the pressure modulators of the respective wheel brake.

The measured temperature is suitably used to monitor charging and/or discharging of the accumulator. During pump operation, the pressure gradient in the accumulator is monitored for plausible values. The reliable plausibility range is typically set within wide limits, since low pressure gradients that can be produced by the pump at low temperatures of roughly −30 degrees, for example, is covered. The use of temperature information can greatly narrow this plausibility range, making it possible to more effectively monitor accumulator charging. Particularly when starting up the engine at low temperatures, the pump delivery rate can be so low that the accumulator is not charged at all. In this case, startup can initially take place with the use of a temporary backup system, activating the electrohydraulic brake system as soon as a corresponding temperature signal is received. The temporary backup system can thus control the function of a certain backup mode, particularly the backup mode involving basic operation. However, the temporary backup system can also manage and use multiple functional backup modes.

It has proven to be advantageous to take into account the measured temperature when monitoring, i.e., checking, valves before or during motor vehicle operation. Pressure compensation procedures, like those that occur, for example, during pre-drive checks or drive checks for monitoring on/off and control valves (checking the valves to see if they are operated according to specification), take a long time at low temperatures. By taking into account the temperature information according to the present invention, the waiting times/filter times for such effects can be adjusted according to temperature (for example, extended at low temperatures and shortened at high ones), thus providing greater protection against erroneous shutdown.

The measured temperature is also suitably taken into account when monitoring the pedal displacement simulator. The pedal displacement simulator monitor checks the correlation between the measured quantities that express the driver request. To reliably detect the driver request, it is useful to measure a variety of physical quantities, such as pedal displacement and pedal force as well as the pressures derived from them such as displacement of the plunger rod piston or the main brake cylinder pressure. The relationship between these quantities can be monitored because it is possible to define maximum and minimum tolerances within which the measured quantities usually lie. If the measured values lie outside this tolerance range, an error has occurred, and the system switches to a corresponding emergency mode. Temperature-dependent hysteresis effects due to friction forces greatly expand this range occurring in an electrohydraulic brake system operating according to specification. Especially at low temperatures, much greater deviations occur from the conditions that apply at higher temperatures. To make the check more accurate, the permissible tolerance range is advantageously expanded and restricted, respectively, as a function of the brake system temperature.

The measured temperature is suitably used to monitor the venting status in backup mode. For this purpose, for example, a precisely defined pulse (e.g., opening the intake valves for a defined period of time) can be used to inject a small amount of brake fluid, i.e., hydraulic fluid, into the wheel grips and subsequently determine the stationary pressure that this produces. Because this pressure is greatly dependent on the prevailing temperature, taking the temperature into account can make such a measurement more precise because the pressure-volume curve is temperature-dependent.

It has also proven to be advantageous to take the measured temperature into account when monitoring wear on the accumulator. The accumulator provided is designed as a wearing, i.e., replaceable, part. The serviceability of this accumulator is therefore checked on a regular basis. The gas filling pressure can be used as a measure of accumulator quality. However, this gas filling pressure is heavily dependent on temperature (for example, 60 to 120 bar over a temperature range of between −40° C. and 120° C.). By taking the system temperature into account, these measurements can be made much more accurate, thereby indicating whether the accumulator needs to be replaced.

DETAILED DESCRIPTION

Figure 1:
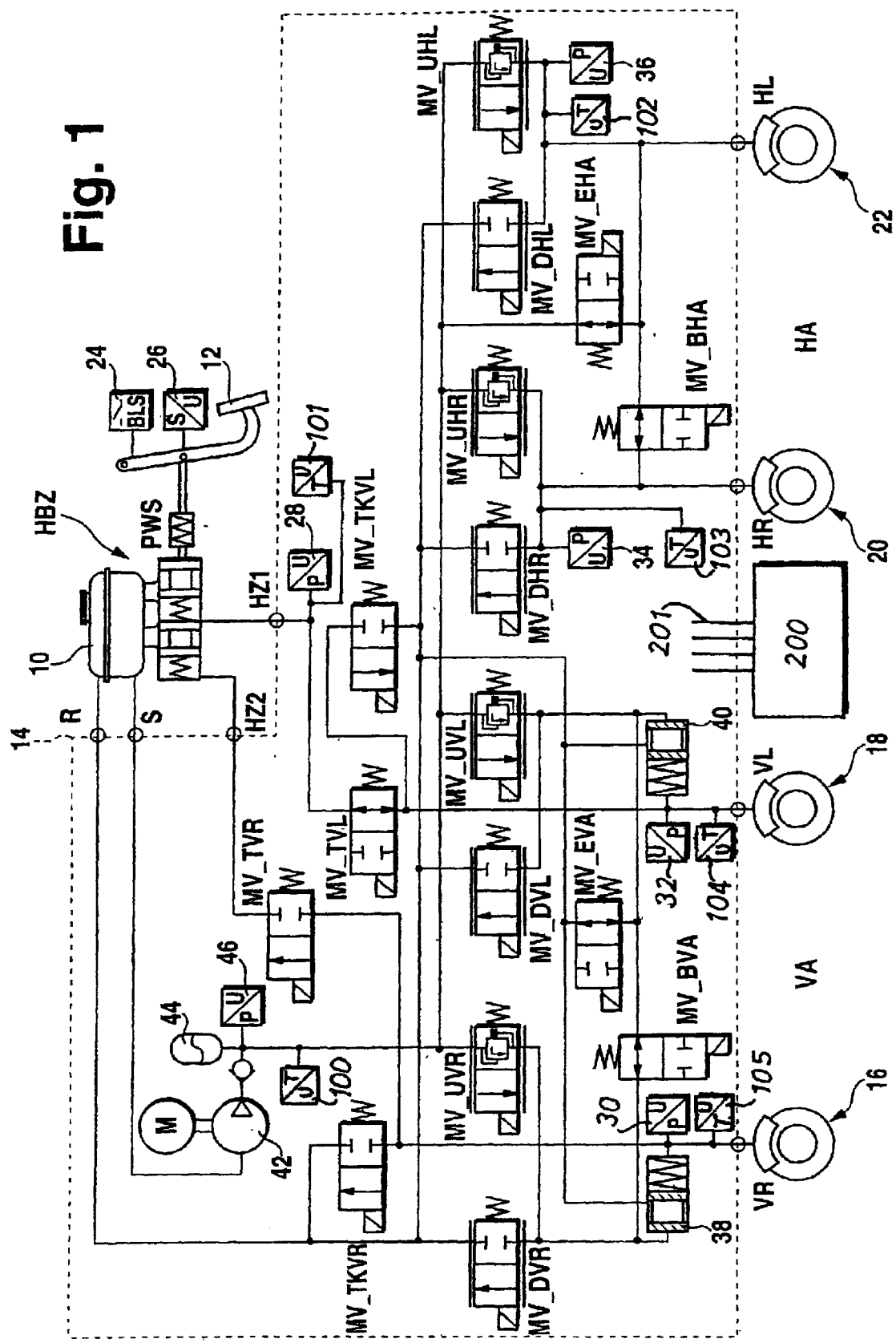
FIG. 1 shows a preferred embodiment of an electrohydraulic brake system.

The electrohydraulic brake system illustrated in FIG. 1 shows a main brake cylinder HBZ with a reservoir 10, to which a brake pedal operated by the driver is attached. A hydraulic unit 14 is also provided which includes valve and pump arrangements for controlling wheel brakes 16, 18, 20, and 22. Brake pedal 12 is connected to a brake pedal switch 24, which closes when the brake pedal is operated, and a measuring system 26 for detecting the brake pedal displacement. Brake pedal switch 24 can be designed as a simple NO contact or, to improve the monitoring capability, as a dual switch with an NC contact and an NO contact. In a special embodiment, break pedal switch 24 is designed as a brake light switch BLS. Measuring system 26 can also have a an improved redundant design to detect displacement S of pedal 12. A pedal displacement simulator PWS is also provided to simulate a counterforce for the driver when operating brake pedal 12. Two brake circuits HZ1 and HZ2 are connected to main brake cylinder HBZ. Into each of them is inserted a block valve MV_TVR and MV_TVL, respectively, which is closed in an electrically operated brake system by applying power. Upstream from the block valve, a pressure sensor 28 provided in at least one of the brake circuits measures the pressure applied by the driver when he operates the brake pedal. When the block valves are closed, the main brake cylinder is hydraulically disconnected from the pressure regulating system. The pressure regulating system contains one pressure modulator per wheel brake for regulating the brake pressure. Each pressure modulator includes an intake valve (MV_UVR, MV_UVL, MV_UHR, MV_UHL), a discharge valve (MV_DVR, MV_DVL, MV_DHR, MV_DHL), and a pressure sensor 30, 32, 34, and 36, which measures the pressure in the line leading to the wheel brake. Each front wheel pressure modulator contains a media separating piston 38 and 40, respectively, between the valves (intake and discharge valves) and the pressure sensors, i.e., the wheel brake. The pressure modulators are connected via balance valves MV_BVA and MV_BHA, which can be controlled independently of each other when power is applied. Relief valves MV_EVA and MV_EHA are also provided for each axle, enabling pressure to be released from the wheel pressure modulators of an axle in the de-energized state. They connect the pressure modulators of one axle to the return lines leading to reservoir 10. In an electrically controlled mode, power is applied continuously to these two valves, i.e., they are closed. A temperature compensation valve MVTKVL and MVTKVR is provided for each front wheel pressure modulator. These valves are closed in the de-energized state, opening upon application of power to release pressure from the pressure modulator of one front wheel if certain conditions are met, in particular a very long braking duration. The temperature compensation valves establish a connection between the brake line leading to the wheel brake and the return line. The power for modulating the brake pressure comes from a pump 42 driven by an electric motor, in particular a single-piston high-pressure pump. The latter is connected to an accumulator 44, in particular a high-pressure accumulator that serves as a buffer, and whose pressure is measured by a pressure sensor 46. The pressure line of pump 42 leads to the intake valves of the wheel brakes, while the suction line of pump 42 is connected to reservoir 10.

The preferred embodiment illustrated in FIG. 1 shows the details of the hydraulic circuit. Relief valves MV_EVA and MV_EHA and temperature compensation valves MV_TKVL and MV_TKVR are omitted in one embodiment. Due to the safety concerns expressed above, six temperature sensors 100 to 105 are illustrated here. These temperature sensors can be designed as temperature measuring elements included in pressure sensors 30, 32, 34, 36, and 46, or as separate temperature sensors. The number of temperature sensors in this case is determined by the two-of-three safety arrangement. A larger or smaller number is equally possible, for example one pressure sensor for each brake circuit. A temperature estimate can also serve as the basis for this. A control unit 200 performs the open- and closed-loop control procedures for the electrohydraulic brake system. In the interest of clarity, a schematic representation of only four feed and discharge lines 201 is provided.

During normal operation, the brake system illustrated in FIG. 1 functions as follows. The driver presses the brake pedal. In doing so, he feels the displacement-dependent counterforce. This displacement dependency is formed by the defined characteristic of pedal displacement simulator PWS. Upon sensing a brake request via pedal displacement sensor 26, brake pedal switch 24 and/or pressure sensor 28, block valves (MV_TVR and MV_TVL) and relief valves (MV-_EVA and MV EHA) close. A pressure resulting from the pedal force builds up in main brake cylinder HBZ. The driver's brake request is calculated from the signals of brake pedal switch 24, displacement sensor 26, and/or pressure sensor 28, for example, as a setpoint delay or setpoint braking force. The individual setpoint wheel brake pressures are formed from this bake request. Depending on the vehicle status and slip condition, these pressures are modified and regulated by applying power to the valves via the wheel pressure modulators. When the control loop is closed, the instantaneous pressures at the wheel pressure sensors of each wheel brake are used in the setpoint/actual value comparison. If the setpoint pressures in the left and right wheels of one axle are different, the balance valves (MV_BVA and MV_BHA) close and the predefined setpoint pressure in each wheel brake is regulated by activating the intake and discharge valves, thus adjusting the actual brake pressure to the setpoint brake pressure. To build up pressure at one wheel brake, power is applied to the intake valve until the desired setpoint pressure forms with the desired dynamics in the wheel brake. The pressure is released correspondingly by applying power to the discharge valve, causing brake fluid to flow back to the reservoir via the return line. The relief valves are activated if the system malfunctions. If the electric system fails during a braking action, all valves return to their de-energized state. The relief valves then open the pressure modulators toward the return line so that no brake pressure can be trapped. In idle mode, these valves also equalize the volume in the direction of the reservoir when temperature fluctuations occur. This process of returning the valves to their de-energized state when the electric system fails during a braking action and subsequently activating the relief valves thus corresponds to the full backup mode described above in which a hydraulic-mechanical basic braking function can still be carried out.

Pump 42 is activated when the receiver pressure in accumulator 44 drops below a preset value. In addition to this function, the receiver pressure measured by pressure sensor 46 is also evaluated as part of the control operation, because it largely represents the pressure present at the input of the intake valves.

The open- and closed-loop control procedures described can be carried out with a control unit 200. In the interest of clarity, connecting lines that connect the control unit to the individual components to be controlled in the electrohydraulic brake system are illustrated only on the control unit side and are all identified by reference number 201. The temperature sensors that measure the temperature of the hydraulic fluid, i.e., brake fluid, as mentioned above, and transfer it to control unit 200, are identified by reference numbers 100 to 105. The control and monitoring procedures described above can then be carried out in the control unit. It is also conceivable for the temperature signals to be transferred to a further control unit that interacts with control unit 200.

The illustrated embodiment shows six temperature sensors. This is a suitable number of sensors for good safety control (e.g., two-of-three selection per brake circuit, i.e., a sensor signal is determined to be correct when two out of three sensors agree), so that the electrohydraulic brake system can continue to be operated and monitored in the manner according to the present invention even if one sensor fails. The lengths of the lines to the temperature sensors are selected on the basis of the drawing and do not represent a functional relationship. In addition to the temperature sensors shown here, which can directly measure the hydraulic fluid temperature, i.e., the brake fluid temperature, sensors can also be used which measure, i.e., sense, the temperature of the electrohydraulic brake system or hydraulic unit, e.g., based on the temperature of components such as valves.

Figure 2:
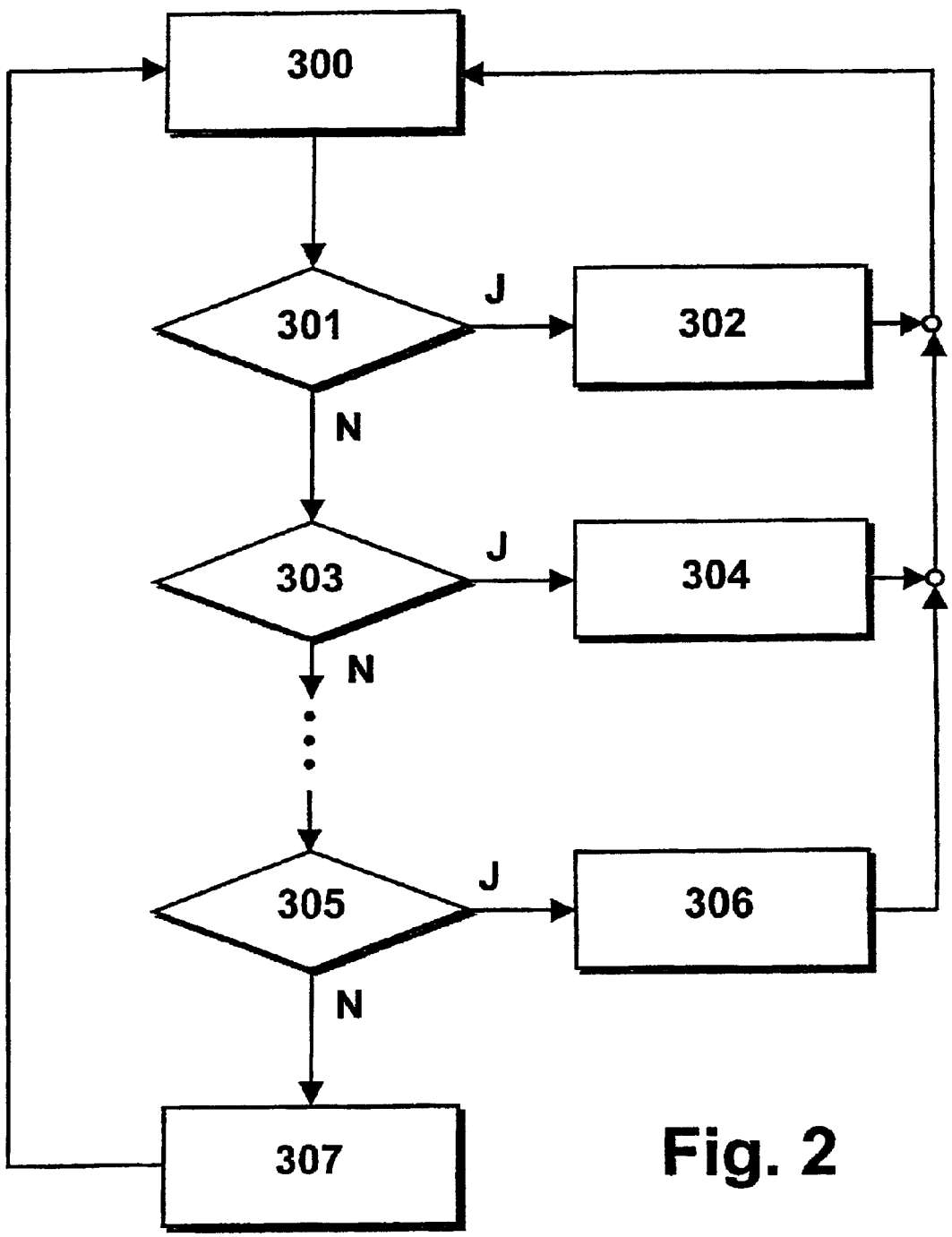
FIG. 2 shows a method for switching between different control actions, using various temperature limit values.

FIG. 2 shows a method in the form of a flowchart for evaluating the temperature information. The temperature is measured or estimated in block 300. Block 300 also contains a start and stop condition of the method. A start condition, for example, can be operation of the starter switch of the vehicle, thereby generating a start signal. Operating again to switch off would then correspond to a possible stop condition. Alternatively, it would be possible to maintain the sequence for a certain period a time after shutdown, for example to perform a subsequent valve test or other system checks. Temperature T measured in block 300 brings the sequence to query 301. This query determines whether temperature T lies below a first limit value TG1. If so, the sequence moves on to block 302, where action M1 assigned to this first temperature limit value TG 1 is carried out. If temperature T reaches or exceeds limit value TG1, the sequence moves on to query 303. This query checks whether temperature value T is below a second limit value TG2. If so, second action M2, which correlates to temperature limit value TG2, is initiated in block 304. If the temperature reaches or exceeds second limit value TG2, the sequence moves on to a subsequent query. This procedure can repeat with as many limit values TGn as necessary. In the end, a final query 305 is reached, which checks whether temperature value T, for example, lies below limit value TGn. If so, actions Mn in conjunction with limit value TGn are initiated and carried out, respectively, in block 306. If the temperature also reaches or exceeds maximum limit value, e.g., TGn, the sequence moves on to block 307, where actions Mn+1 are carried out for a very high temperature value exceeding TGn. The example just described, i.e., the conditions illustrated in queries 301, 303, 305, assumes positive limit values TG. However, the method can also be carried out for temperature limit values TG below 0° C. or for mixed limit values that are both below and above 0° C. Generally, the important thing is that specific assigned actions M are carried out in the electrohydraulic brake system for specific temperatures or temperature ranges.

These actions M thus also include the various possible backup modes for certain function combinations already discussed above. In a special embodiment, different predefinable or measurable temperatures or temperature ranges can thus be assigned different backup modes, for example to minimize heat-generating processes. In this case, for example, maximum limit value TGn would be assigned the full backup mode once it has been reached or exceeded.

The various actions then lead to block 300 again, where temperature T is measured once more. This makes it possible to define, within action blocks 302, 304, 306, 307, certain time segments during which the actions can be carried out before another temperature T is measured. Alternatively, it is possible to re-measure temperature T after each pass and either continue or discontinue previously initiated actions M as a function of this temperature.

Actions M are used or modified to control the electrohydraulic brake system. Among other things, they relate to the applications for open- and closed-loop control of the electrohydraulic brake system described above.

Figure 3:
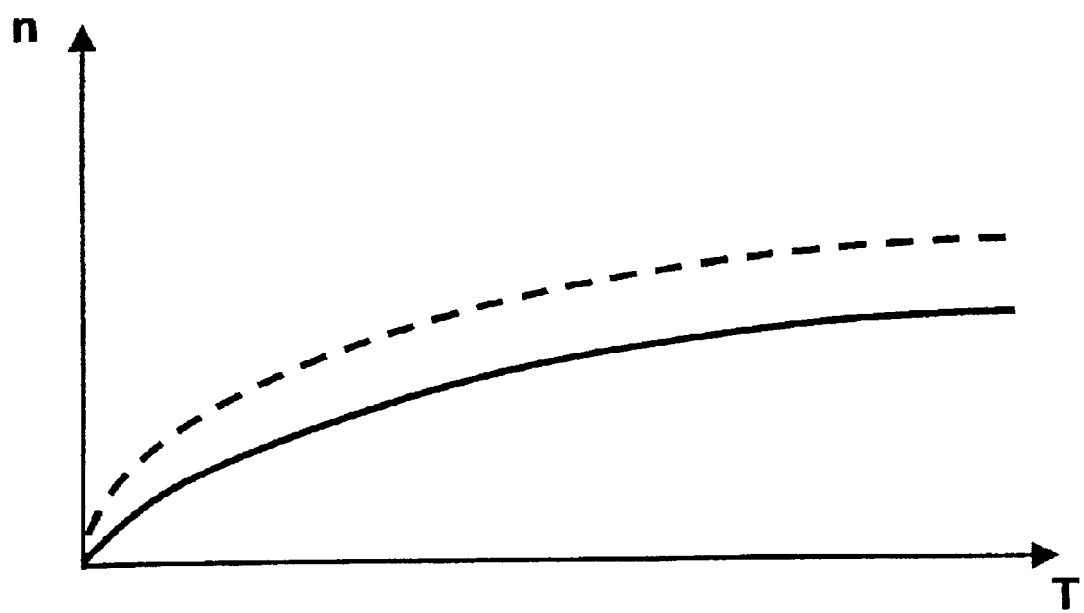
FIG. 3 shows a correlation between pump speed and temperature for a special application, i.e., a pump control procedure.

One special embodiment for this purpose is to use the temperature in relation to pump speed. The fill level of the pump element, i.e., pump 42, depends on the brake fluid viscosity. The brake fluid viscosity is greatly dependent on temperature. If pump 42 is driven at a speed nopt, at which the pump reaches an optimum fill level, this increases the pump delivery rate. This delivery rate is higher than it would be if the pump had a minimal fill level at a low temperature and if the pump motor were being driven at top speed. Adjusting the pump motor speed in this manner via temperature to ensure a maximum pump fill level increases the pump delivery rate. As a result, the pump motor is operated in clocked mode, i.e., the markto-space ratio is set so that speed n of the pump is always adjusted to ensure an optimum pump fill level. Because it is heavily dependent on viscosity, this pump speed n is also dependent on temperature T. In FIG. 2, this means that different pump speeds n can be set, for example as a function of corresponding temperature limit TG. The pump is therefore operated at a speed n1 up to a temperature limit TG1. The pump speed changes to n2 in the second temperature segment up to TG2. This can continue until reaching limit TGn, at which the pump is operated at a speed nn. Consequently, speed nn+1 is used above temperature limit TGn. In one situation, therefore, pump speed n can increase in a linear relationship with temperature T. A further relationship between pump speed n and temperature T, which is perhaps more applicable in practice, essentially allows the pump speed to continue to rise along with an increase in temperature, although the resulting curve shows a more gradual gradient at higher temperatures. As a result, this curve does not show a linear variation, but rather demonstrates a different functional condition, as illustrated, for example, in FIG. 3.

The dotted curve indicates a higher delivery rate, achieved by increasing the speed, as opposed to the solid curve. Thus, the conditions can be established with this type of characteristic or characteristic family instead of using individual temperature ranges, i.e., temperature limit values TG.

What is claimed is:

1. A method for controlling an electrohydraulic brake system of a motor vehicle, comprising the steps of:

measuring a temperature of the electro hydraulic brake system;

controlling the electrohydraulic brake system in accordance with the measured temperature;

comparing the measured temperature to at least one preset temperature limit value;

initiating actions as a function of the comparison; and setting different pump speeds of the electrohydraulic brake system as a function of a comparison to at least one definable temperature limit value.

2. The method according to claim 1, further comprising the step of:

minimizing heat-generating processes as a function of the measured temperature by taking into account an adequate functionality of the electrohydraulic brake system.

3. The method according to claim 1, further comprising the step of:

varying a mark-to-space ratio as a function of the measured temperature during a clocked control of a pump of the electrohydraulic brake system.

4. The method according to claim 1, further comprising the step of:

controlling a system pressure in the electrohydraulic brake system in accordance with the measured temperature.

5. The method according to claim 4, wherein:

the step of controlling the system pressure is performed during a buildup in pressure in at least one wheel brake by opening corresponding intake valves.

6. The method according to claim 1, further comprising the step of:

estimating a pressure in an accumulator of the electrohydraulic brake system in accordance with the measured temperature.

7. The method according to claim 1, further comprising the step of:

monitoring at least one of a charging and a discharging of an accumulator of the electrohydraulic brake system in accordance with the measured temperature.

8. The method according to claim 1, further comprising the step of:

checking valves at a time that is at least one of before, during, and after a motor vehicle operation in accordance with the measured temperature.

9. The method according to claim 1, further comprising the step of:

monitoring characteristic input quantities for the electrohydraulic brake system in accordance with the measured temperature.

10. The method according to claim 9, wherein:

one of the characteristic input quantities corresponds to a pedal displacement simulator.

11. The method according to claim 1, further comprising the step of:

performing at least one of a controlling and a monitoring of pressure modulators of respective wheel brakes in accordance with the measured temperature.

12. The method according to claim 1, further comprising the step of:

monitoring a venting state in accordance with the measured temperature when at least one valve arrangement returns to a de-energized state.

13. The method according to claim 1, further comprising the step of:

monitoring wear on an accumulator in accordance with the measured temperature.

14. The method according to claim 1, further comprising the step of:

setting a particular desired functional backup mode of the electrohydraulic brake system in accordance with the measured temperature.

15. A method for controlling an electrohydraulic brake system of a motor vehicle, comprising the steps of:

measuring a temperature of the electrohydraulic brake system;

controlling the electrohydraulic brake system in accordance with the measured temperature;

comparing the measured temperature to at least one preset temperature limit value;

initiating actions as a function of the comparison; and carrying out the actions such that the actions assist in minimizing heat-generating processes in the electrohydraulic brake system.

16. A device for controlling an electrohydraulic brake system, comprising:

a first arrangement for measuring a temperature in the electrohydraulic brake system;

a second arrangement for processing a quantity representing the measured temperature; and a third arrangement for controlling the electrohydraulic brake system as a function of the processed quantity representing the temperature, where the third arrangement includes setting different pump speeds of the electrohydraulic brake system as a function of processed quantity representing the temperature.

17. A method for controlling an electrohydraulic brake system of a motor vehicle, comprising the steps of:

measuring a temperature of the electrohydraulic brake system;

controlling the electrohydraulic brake system in accordance with the measured temperature; and estimating a pressure in an accumulator of the electrohydraulic brake system in accordance with the measured temperature.

18. A method for controlling an electrohydraulic brake system of a motor vehicle, comprising the steps of:

measuring a temperature of the electrohydraulic brake system;

controlling the electrohydraulic brake system in accordance with the measured temperature; and monitoring at least one of a charging and a discharging of an accumulator of the electrohydraulic brake system in accordance with the measured temperature.

19. A method for controlling an electrohydraulic brake system of a motor vehicle, comprising the steps of:

measuring a temperature of the electrohydraulic brake system;

controlling the electrohydraulic brake system in accordance with the measured temperature; and monitoring wear on an accumulator in accordance with the measured temperature.

* * * * *